April 14, 1953 A. COTSWORTH III 2,635,184

AUTOMATIC GAIN CONTROL CIRCUIT

Filed Dec. 22, 1949 2 SHEETS—SHEET 1

ALBERT COTSWORTH III
*INVENTOR.*

BY Francis W. Crotty

HIS ATTORNEY

April 14, 1953 A. COTSWORTH III 2,635,184

AUTOMATIC GAIN CONTROL CIRCUIT

Filed Dec. 22, 1949 2 SHEETS—SHEET 2

ALBERT COTSWORTH III
*INVENTOR.*

BY Francis W. Crotty
HIS ATTORNEY

Patented Apr. 14, 1953 2,635,184

UNITED STATES PATENT OFFICE 2,635,184

AUTOMATIC GAIN CONTROL CIRCUIT

Albert Cotsworth III, Oak Park, Ill., assignor to Zenith Radio Corporation, a corporation of Illinois Application December 22, 1949, Serial No. 134,410

2 Claims. (Cl. 250—20)

Figure 1:
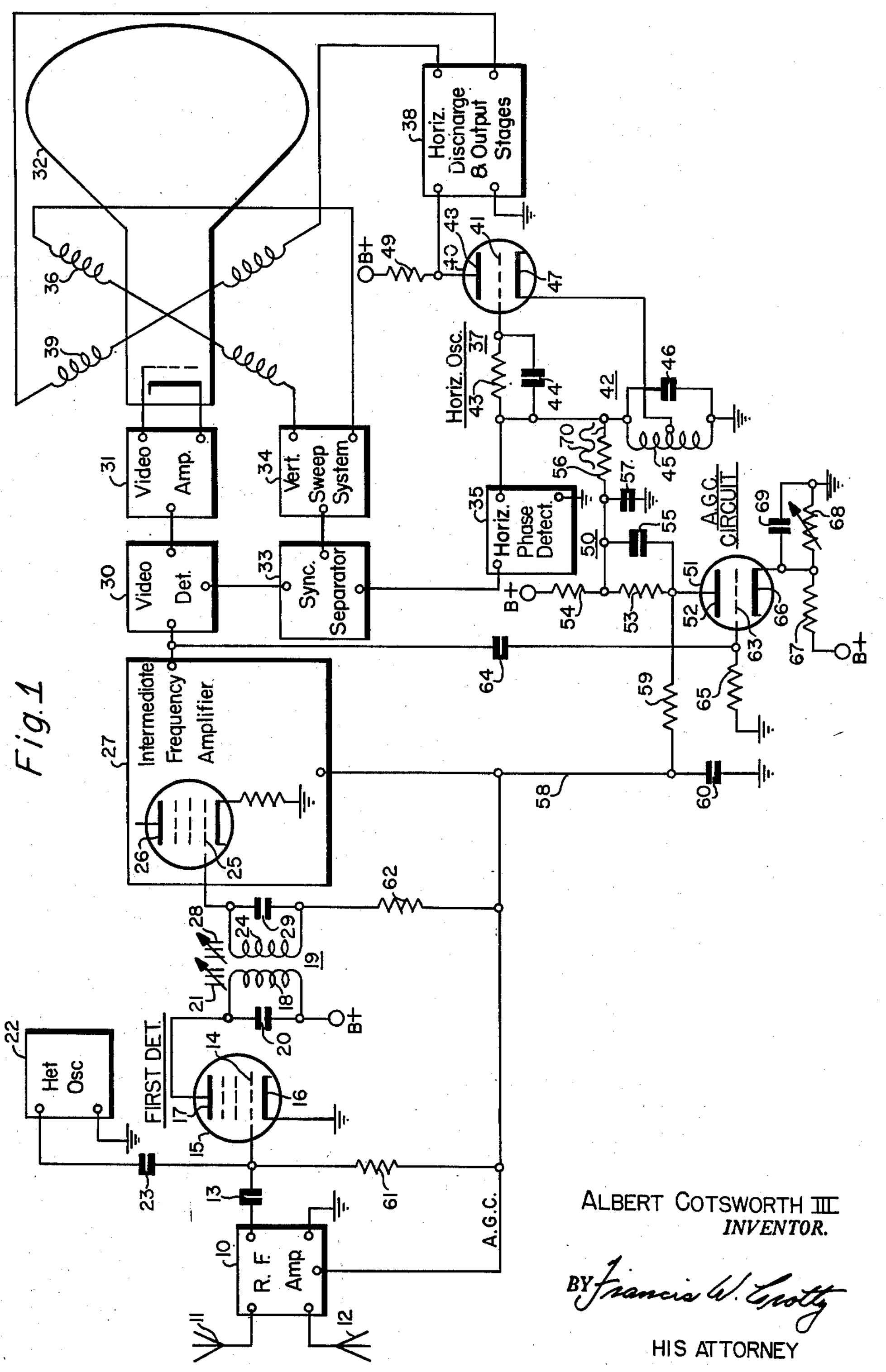

This invention relates to gain-control circuits for use in television receivers or the like for controlling the gain of such receivers automatically in accordance with the amplitude characteristics of received television signals.

One type of automatic gain control circuit heretofore proposed is disclosed in copending application Serial No. 39,368, filed July 17, 1948, which matured into U. S. Patent No. 2,593,011 on April 15, 1952, entitled "Automatic Gain Control Circuit for Television Receivers," by Albert Cotsworth III, and assigned to the present assignee. The circuit disclosed in this copending application is rendered sensitive only during recurring intervals corresponding to the horizontal synchronizing pulse intervals of the received television signal. This is accomplished by deriving a gating signal from the horizontal-sweep system and utilizing this signal to excite an electron-discharge device in the automatic gain-control circuit. When such a circuit is used in a television receiver the gain-control signal developed thereby is substantially independent of noise signals and the like occurring during trace intervals because the control circuit is rendered insensitive by the gating signal during these latter intervals.

The automatic gain-control circuit of the aforementioned application has proved highly satisfactory and is widely accepted in the television art. However, certain difficulties have been encountered in the use of this control circuit and of other prior gain-control circuits. These difficulties arise, since it is highly desirable in television receivers to apply the automatic gain-control signal developed therein to the first detector stage as well as to the intermediate-frequency and radio-frequency amplifier stages. Such a control of the first detector is particularly desirable in receivers operating in the proximity of television transmitters since without it, the high-gain intermediate-frequency amplifier stages tend to become overloaded upon reception of high-strength signals from these transmitters. However, in most television receivers, the heterodyning signal from the heterodyne oscillator is applied to the same control electrode of the first detector as is the radio-frequency signal from the radio-frequency amplifier. Now, should the automatic gain-control circuit also be connected to the first detector and the receiver be tuned to a weak television signal, the gain-control signal may drop to zero and the heterodyning signal may drive the control electrode of the first detector positive during its positive peaks and give rise to a negative bias in the control electrode circuit due to self-biasing action. The automatic gain-control connection to the first detector provides a common lead from the control electrode circuit of the first detector to the intermediate-frequency amplifier stages. Consequently when the automatic gain-control signal drops to zero permitting the first detector to develop a negative self-bias under the influence of the heterodyne oscillator, that bias is likewise inherently supplied to the intermediate-frequency amplifier. This gives rise to a condition during the reception of a weak signal wherein the receiver is not operating at maximum sensitivity due to the biasing action of the heterodyne oscillator.

The present invention provides an automatic gain-control circuit for a television receiver, similar in some respects to the control circuit of the aforementioned application, but which includes a network for counteracting the biasing action of the heterodyne oscillator to enable automatic gain control to be applied to the first detector and yet allow the receiver to operate with maximum sensitivity during the reception of weak television signals.

It is, accordingly, an object of this invention to provide an improved automatic gain-control circuit for use in television receivers and the like, which control circuit is relatively insensitive to noise signals and other extraneous signals received concurrently with an incoming television signal, and which provides a high degree of gain control yet enables the receiver to operate with maximum sensitivity during the reception of low-intensity television signals.

Figure 2:
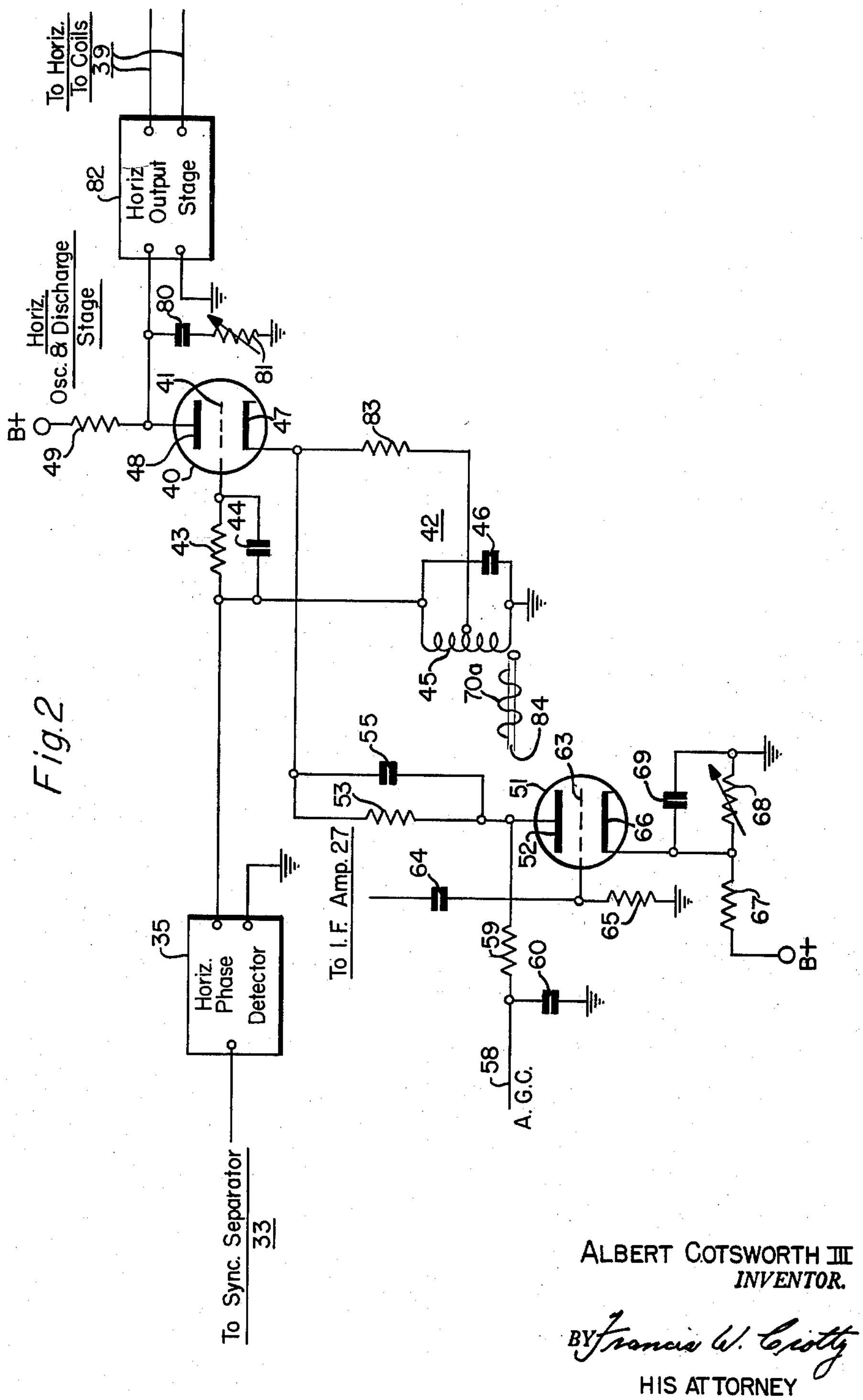

The features of this invention which are believed to be new are set forth with particularity in the appended claims. The invention itself, however, together with further objects and advantages thereof may best be understood by reference to the following description when taken in conjunction with the accompanying drawing, in which:

Figure 1 illustrates one embodiment of the invention incorporated into a television receiver, and, Figure 2 illustrates a second embodiment of the invention.

The television receiver illustrated in Figure 1 includes a radio-frequency amplifier 10 of any desired number of stages, the input terminals of which may be connected to any suitable antenna circuit 11, 12. The output terminals of the amplifier 10 are connected respectively to ground and through a coupling capacitor 13 to the control electrode 14 of an electron-discharge device 15. The discharge device 15 is connected to form the first detector of the receiver and has a cathode 16 connected to ground. The anode 17 is connected to the positive terminal B+ of a source of unidirectional potential through the primary winding 18 of an intermediate-frequency transformer 19, this winding being tuned to the selected intermediate-frequency of the receiver by a capacitor 20 (which is usually formed at least in part by the output capacity of the device 15) and the inductance of this winding being adjustable by means of a movable core therein represented by the symbol 21. The heterodyning signal is supplied to the control electrode 14 from a heterodyne oscillator 22, this oscillator being coupled to the control electrode through a capacitor 23.

The secondary winding 24 of the transformer 19 has one terminal connected to control electrode 25 of an electron-discharge device 26, the device 26 being connected to form the first stage of the intermediate-frequency amplifier 27. The inductance of the winding 24 is adjustable by means of a core movable therein as represented by the symbol 28 and is tuned to the selected intermediate frequency of the receiver by a capacitor 29 (usually formed at least in part by the input capacity of the device 26).

The output circuit of the intermediate-frequency amplifier 27 is connected to a video detector 30 which, in turn, is connected to a video amplifier 31 of any desired number of stages. The output terminals of the amplifier 31 are connected to the control electrode and cathode of a cathode-ray image-reproducing device 32 to control the intensity of the cathode ray therein, in well-known manner. The video detector 30 is further connected to a synchronizing-signal separator 33 which is connected to a vertical-sweep system 34 and to a horizontal phase detector 35. The output terminals of the vertical-sweep system 34 are connected to vertical-deflection elements 36 of the reproducing device 32 to control the vertical sweep of the cathode-ray therein. The output terminals of the horizontal phase detector 35 are connected to a horizontal oscillator 37 which, in turn is connected to a unit 38 which includes the horizontal discharge and horizontal output stages of the receiver. The output terminals of the unit 38 are connected to the horizontal-deflection elements 39 of the device 32 to control the horizontal sweep of the cathode ray therein.

The television receiver thus far described is quite conventional and operates in well-known manner to reproduce an image on the screen of device 32 corresponding to the transmitted picture represented by a received television signal. Such a television signal is intercepted by antenna 11, 12 and amplified in the radio-frequency amplifier 10. The amplified radio-frequency signal is heterodyned to the selected intermediate frequency of the receiver in first detector 15, the resulting intermediate-frequency signal is amplified in intermediate-frequency amplifier 27 and detected in video detector 30. The detected video signal from the detector 30 is amplified in video amplifier 31 and then impressed on the control electrode of reproducing device 32.

The synchronizing-signal components of the received television signal are separated from the detected video-signal components by means of the synchronizing-signal separator 33. The vertical-synchronizing pulses from the separator 33 are used to control the operation of the vertical sweep system 34 to synchronize the vertical sweep of the cathode ray in device 32. The horizontal-synchronizing pulses from separator 33 are supplied to the horizontal phase detector 35 which, in turn, controls the frequency of the horizontal oscillator 37 to synchronize this frequency with the repetition frequency of the horizontal-synchronizing pulses. The synchronized output signal of the oscillator 37 is impressed on unit 38 wherein a saw-tooth wave is produced and amplified and supplied to the horizontal deflection elements 39 to control the horizontal sweep of the cathode ray in device 32.

In this manner, the intensity of the cathode ray in the image-reproducing device 32 is controlled in accordance with the video-signal components of the received television signal, and the sweep of the cathode ray over the screen of device 32 is synchronized with synchronizing-signal components of the received signal. The device 32, therefore, reproduces an image corresponding to the televised picture represented by the received television signal. The portion of the receiver used to reproduce the sound components of the received television signal forms no part of the present invention and for that reason has not been shown.

The horizontal oscillator 37 includes an electron-discharge device 40. The control electrode 41 of device 40 is connected to one terminal of a frequency-determining network 42 through a resistor 43 shunted by a capacitor 44. The network 42 comprises an inductance coil 45 shunted by a capacitor 46, the center tap of coil 45 being connected to cathode 47 of device 40 and the other terminal of this network being connected to ground. The anode 48 of device 40 is connected to the positive terminal of a potential source B+ through a load resistor 49. Oscillation is established in the oscillator circuit and a sine-wave signal appears in the network 42 the frequency of which is controlled in well-known manner by the phase detector 35. The device 40 is so biased that it operates as a class C oscillator, and output pulses are produced across the load resistor 49 having a repetition frequency corresponding to the frequency of the sine wave signal in the network 42. These output pulses are utilized to control the unit 38 so that it produces a saw-tooth wave synchronized with horizontal-synchronizing pulses of the received television signal as delivered from the synchronizing-signal separator 35.

The present invention resides in the automatic gain-control circuit which is represented generally as 50. This circuit includes an electron-discharge device 51 having an anode 52 connected to the positive terminal B+ of a source of unidirectional potential through a pair of series-connected resistors 53 and 54, the resistor 53 being shunted by a capacitor 55 to form an integrating network. The junction of resistors 53, 54 is connected to the ungrounded terminal of network 42 through a resistor 56 and to ground through a capacitor 57, resistor 56 and capacitor 57 forming a phase-shifting network for reasons to be described. The anode 52 is also connected to a lead 58 through a resistor 59, which, in conjunction with a capacitor 60, forms a filter network for the output signal of the automatic gain-control circuit, the lead 58 supplying the automatic gain-control signal to various stages of the receiver. The lead 58 may be connected, for example, to the radio-frequency amplifier 10, to the control electrode 14 of first detector 15 through a resistor 61, to the tuned input circuit of the first intermediate-frequency amplifier stage through a resistor 62 and to the various other intermediate-frequency amplifier stages.

The intermediate-frequency signal from the amplifier 27 is supplied to the control electrode 63 of device 51 through a coupling capacitor 64, this control electrode being connected to ground through a grid-leak resistor 65. The cathode 66 of device 51 is connected to the positive terminal of a potential source B+ through a resistor 67 and to ground through a variable resistor 68, the resistors 67 and 68 forming a potentiometer between the terminal B+ and ground and the resistor 68 being by-passed for intermediate frequencies by a capacitor 69.

Neglect for the moment the effect of the positive potential impressed on the automatic gain-control circuit 50 from the positive terminal B+ through the resistor 54. The intermediate-frequency signal corresponding to a received television signal is applied to the control electrode 63 of device 51 through a capacitor 64, and the sine-wave signal indicated 70 from the frequency-determining network 42 of the horizontal oscillator 37 is supplied to the anode 52 through the phase shifting network 56, 57 and integrating network 53, 55. The phase shifting network 56, 57 is constructed so that the positive peaks of the signal 70 as applied to anode 52 correspond in time to the recurring intervals of the horizontal synchronizing-signal components of the intermediate-frequency signal applied to control electrode 63. The device 51 is biased by means of the potentiometer 67, 68 so that the device is conductive only during these recurring intervals of time coincidence between the horizontal synchronizing-signal components and the positive-peak portions of the sinusoidal signal 70. Therefore, current pulses flow through the device 51 during the intervals of the horizontal synchronizing-signal components, these pulses having an amplitude proportional to the intensity of the intermediate-frequency signal obtained from the intermediate-frequency amplifier 27. These current pulses flow through the integrating network 53, 55 whose time constant is made such that a control signal is developed thereacross having amplitude variations corresponding to intensity variations of the aforementioned intermediate-frequency signal. This control signal is negative with respect to ground and supplied to the lead 58 through the filter 59, 60, this filter functioning to remove the sine wave 70 from the output signal of the automatic gain-control circuit. The lead 58 is connected, as previously described, to various stages of the receiver and the control signal acts to control the gain of the receiver in accordance with the intensity of received television signals.

The automatic gain-control circuit functions properly to control the gain of the receiver even in the presence of noise pulses and the like received concurrently with the television signal since the device 51 is gated so that it is rendered conductive only during the intervals of the horizontal-synchronizing signal components. The gating function effectively desensitizes the gain-control system to any signals, spurious or not, received during the relatively long line-trace intervals of the received signal which intervene successive synchronizing components.

A disadvantage of the gain-control circuit as thus far described with no connection from anode 52 to the positive terminal B+ through resistor 54, is that when a low-intensity television signal is received the amplitude of the horizontal synchronizing-signal components thereof may be insufficient to render device 51 conductive, and the amplitude of the automatic gain-control signal otherwise established on lead 58 thereupon drops toward zero. This occurs because the signal applied to the anode 52 from network 42 has no appreciable direct-current component and is merely the sine wave 70 having a mean potential of zero with respect to ground. Therefore, little or no bias is applied to the control electrode 14 of first detector 15 by the automatic gain-control circuit. Under this condition, the heterodyning signal applied to this control electrode by the heterodyne oscillator 22 may have sufficient amplitude to drive the control electrode positive during its positive peak portions. This results in well-known grid rectification which permits condenser 13 and resistor 61 to establish a negative bias on the control electrode. Due to the common lead 58 between resistors 61 and 62 this negative bias is also applied to the device 27. Therefore, at a time when a weak television signal is received and the receiver is required to operate with maximum sensitivity, the first detector develops a negative control potential which acts to decrease the gain of the receiver stages that are connected to the automatic gain control string, such as first detector and radio-frequency and intermediate-frequency amplifiers. This undesirable desenitizing of the receiver during the reception of weak signals is avoided by the present invention.

In accordance with one embodiment of the invention, the junction of resistors 53 and 56 is connected to the positive terminal B+ through a resistor 54. The potential divider including resistors 54 and 56 tends to establish the automatic gain control lead 58 at a selected positive value with respect to ground during intervals of reception of a weak signal to obviate the aforementioned desensitizing of the receiver. The effect of the voltage divider connection to source B+ in that regard may be thoroughly understood from the accepted principles of the superposition theory. In the absence of the voltage divider connection, grid-current rectification occasioned in the input circuit of the first detector 14 during the receipt of very weak signals causes the automatic gain control line 58 to assume some known negative value with respect to ground which desensitizes the receiver when it should preferably exhibit maximum gain. On the other hand, the voltage-divider connection considered alone for the same operating conditions tends to establish the potential of the automatic gain control line 58 at a controllable positive value relative to ground. The net result of these opposing tendencies is an adjusted automatic gain control potential which is controlled by the voltage divider. Where its contribution is essentially equal to the bias developed by grid rectification in the first detector, the potential of the automatic gain control string is approximately ground potental. Obviously, it may be set to a slightly negative or a slightly positive value, the latter being oftentimes desired to impart, a relatively sharp cut-off characteristic to the controlled tubes of the intermediate-frequency amplifier. In any event, the potential of the automatic gain control string is controllable so that desensitizing of the receiver in the presence of weak received signals is not experienced.

In a highly satisfactory practical embodiment of the invention in which the first detector stage tended to develop approximately two volts on the automatic gain control lead in the presence of weak television signals, the below-listed elements were given the following values to compensate for this negative potential, and these values are set forth herein merely by way of example:

| | | |
|---|---|---|
| Resistor 53 | megohms | 1.5 |
| Resistor 54 | do | 1 |
| Resistor 56 | ohms | 100,000 |
| Resistor 59 | megohms | 5 |
| Capacitor 55 | microfarads | 0.001 |
| Capacitor 57 | micromicrofarads | 150 |
| Capacitor 60 | microfarads | 0.1 |
| Potential applied to resistor 54 (B+) | volts | 150 |

Some television receivers combine the function of saw-tooth generation in the horizontal discharge oscillator. Such a circuit is shown in Figure 2. The horizontal oscillator may be similar to the circuit of Figure 1, with the exception that a series-connected discharge capacitor 80 and variable resistor 81 are connected between anode 48 and ground. A saw-tooth wave is derived across the network 80, 81 and is applied to horizontal output stage 82 wherein it is amplified and applied to the horizontal-deflection coils 39 shown in Figure 1. With the circuit of Figure 2, it is necessary that the signal generated by the horizontal oscillator be in phase with the horizontal synchronizing pulses of a received television signal since the oscillator initiates directly the saw-tooth wave that controls the horizontal sweep of the cathode-ray image tube of the receiver.

When used in conjunction with the horizontal oscillator and discharge circuit of Figure 2, the automatic gain-control circuit of the present invention may be simplified as compared to the embodiment of Figure 1. Since the signal developed in the oscillator circuit of Figure 2 must necessarily be in phase with the horizontal-synchronizing pulses, the phase-shifting network 56, 57 of Figure 1 may be dispensed with and the network 53, 55 may be connected directly to the cathode 47 of device 40. A resistor 83 is included in this cathode circuit. In this manner the signal 70*a* applied to the anode circuit of device 51 has a positive direct-current component 84 due to the potential drop across resistor 83.

Now, should the received television signal be of such weak intensity that the horizontal-synchronizing components thereof are of insufficient amplitude to render device 51 conductive, the potential of the automatic gain control lead 58 tends to assume a positive potential corresponding to the direct-current component 84 of the signal 70*a*. The value of resistor 83 is so chosen that the value of this positive potential is sufficient to overcome the negative biasing effect of the first detector, so that the receiver retains maximum sensitivity during reception of weak television signals.

This invention provides, therefore, improved automatic gain-control circuits for use in television receivers which furnish a high degree of control to such receivers, yet enable the receiver to operate with maximum sensitivity during the reception of low-intensity television signals.

While particular embodiments of the invention have been shown and described modifications may be made therein and it is intended in the appended claims to cover all such modifications as fall within the true spirit and scope of the invention.

I claim:

1. In a television receiver: a first detector including an electron-discharge device having a control electrode; an input circuit, including a coupling capacitor and a grid-leak resistor connected to said control electrode, for supplying a received television signal to said detector; a heterodyne oscillator coupled to said control electrode for supplying thereto a heterodyne signal which tends to draw grid current in said device and establish a negative biasing potential in said input circuit in the absence of received signals of a predetermined minimum intensity; a gain control system for developing a control potential of negative polarity representing the intensity of received signals; a direct-current connection extending from said gain control system to said input circuit for varying the operating bias of said discharge device to effect gain control in said receiver; and a biasing network, including a source of unidirectional potential of positive polarity, connected to said direct-current connection to compensate for said negative biasing potential in the absence of received signals of said predetermined minimum intensity.

2. In a television receiver: a first detector including an electron-discharge device having a control electrode; an input circuit, including a coupling capacitor and a grid-leak resistor connected to said control electrode, for supplying a received television signal to said detector; a heterodyne oscillator coupled to said control electrode for supplying thereto a heterodyne signal which tends to draw grid current in said device and establish a negative biasing potential in said input circuit in the absence of received signals of a predetermined minimum intensity; a gain control system for developing a control potential of negative polarity representing the intensity of received signals; a direct-current connection extending from said gain control system to said input circuit for varying the operating bias of said discharge device to effect gain control in said receiver; and a biasing network, including a source of unidirectional potential of positive polarity, connected to said direct-current connection to compensate for said negative biasing potential and establish said connection at a substantially zero potential level in the absence of received signals of said predetermined minimum intensity.

ALBERT COTSWORTH, III.

References Cited in the file of this patent

UNITED STATES PATENTS

| Number | Name | Date |
|---|---|---|
| 2,039,615 | Travis | May 5, 1936 |
| 2,307,375 | Blumlein et al. | Jan. 5, 1943 |
| 2,307,387 | Blumlein | Jan. 5, 1943 |
| 2,503,900 | Burnot | Apr. 11, 1950 |
| 2,559,038 | Bass | July 3, 1951 |